(12) United States Patent
Shirai (10) Patent No.: US 6,290,411 B1
(45) Date of Patent: Sep. 18, 2001

(54) STAND UTENSIL FOR KEYBOARD AND KEYBOARD WITH STAND MECHANISM

(75) Inventor: Toshihiko Shirai, Shiga-Gun (JP)

(73) Assignee: Propri Limited, Shiga (JP)

( * ) Notice: Subject to any disclaimer, the term of this patent is extended or adjusted under 35 U.S.C. 154(b) by 0 days.

(21) Appl. No.: 09/171,255

(22) PCT Filed: Apr. 14, 1997

(86) PCT No.: PCT/JP97/01293

§ 371 Date: Mar. 19, 1999

§ 102(e) Date: Mar. 19, 1999

(87) PCT Pub. No.: WO97/39402

PCT Pub. Date: Oct. 23, 1997

(30) Foreign Application Priority Data

Apr. 15, 1996 (JP) .................................... 8-128930

(51) Int. Cl.[7] .................. F16M 11/00; B41J 29/06
(52) U.S. Cl. .................. 400/681; 400/718; 400/691; 400/472; 248/240; 248/175
(58) Field of Search .................. 400/691, 718, 400/680, 681, 682, 489, 472; 248/127, 918, 240, 175, 447.1, 447.2, 455

(56) References Cited

U.S. PATENT DOCUMENTS

| | | | |
|---|---|---|---|
| 3,830,352 | * | 8/1974 | Kolpek ................. 400/682 |
| 4,635,893 | * | 1/1987 | Nelson ................. 400/718 |
| 4,946,121 | * | 8/1990 | Troke ................. 248/201 |

FOREIGN PATENT DOCUMENTS

| | | |
|---|---|---|
| 61-133828 | 8/1986 | (JP) . |
| 63-97121 | * 6/1988 | (JP) . |
| 5-8634 | 2/1993 | (JP) . |
| 3008565 | 3/1995 | (JP) . |
| 8-36439 | 2/1996 | (JP) . |
| 8-255037 | 10/1996 | (JP) . |

* cited by examiner

Primary Examiner—Ren Yan
Assistant Examiner—Leslie J. Grohusky
(74) Attorney, Agent, or Firm—Sterne, Kessler, Goldstein & Fox P.L.L.C.

(57) ABSTRACT

The present invention enables the efficient use of desktop space and the efficient input operation of a keyboard by realizing space-savings for the keyboard by a simple and economical means that does not involve reducing the size of the keyboard. The keyboard occupies the keyboard space on the desktop when it is being used in an input operation and thereby maintains the efficiency of its input operation, and the keyboard is placed in a standing position when additional space on the desktop is required by utilizing the stand gear of the present invention. In addition to the above, the present invention facilitates entry of data from reference materials during the input operation, as well as proofreading the input result against the reference material after the input operation, by positioning the reference material on a paper stand mechanism which is positioned on the stand gear further utilizing "dead" desktop space efficiently. The present invention includes, a stand base and a support arm which constitute the stand gear and a keyboard. The three components are linearly arranged and coupled, so as to be pivotally connected with each other. In such construction, the two endmost components, which are pivotally connected at their respective ends to the other component between them, contact each other so as to form a triangular structure having sides constituted by the respective components, including a base constituted by the stand base.

17 Claims, 12 Drawing Sheets

STAND UTENSIL FOR KEYBOARD AND KEYBOARD WITH STAND MECHANISM

FIELD OF THE INVENTION

This invention relates to the arrangement and construction of a keyboard for a computer, including a personal computer, and of a stand gear for attaching to the keyboard. The stand gear is intended to realize the reduction in keyboard space on the desk by standing the keyboard by a simple operation, thereby providing more efficient use of the desktop space occupied by the personal computer and its peripherals, including the keyboard.

RELATED ART

The keyboard is generally used as one of the input terminals of a computer. The personal computer (PC) is a type of computer which utilizes a keyboard, and "PC" will be used hereinafter to designate computer. As a result of the remarkable spread of the PC in the market in recent years, an individual's desk in an office or home now accommodates a PC and its various peripherals. The PC is situated on the desk where it may be readily reached from an operator's seat and may be operated most efficiently. However, the location of the keyboard of the PC so that it can be readily and efficiently utilized also creates problems on an everyday basis.

One problem is the situation wherein the PC and its peripherals on the desk become an obstacle to doing work, other than PC operation, at the same desk. This problem is a natural consequence of the fact that the keyboard and display monitor of the PC peripherals are indispensable to operation of the PC and thus should be located at least within the operator's reach for their operational requirements. The keyboard most often becomes an obstacle to doing other work because the keyboard is placed just in front of the operator's seat.

Many compact and space-saving PC products have been developed as of late. However, most of these products reduce the space requirements for only the PC itself or display monitor. Thus, the keyboard space problem has not necessarily been resolved by these products.

A second problem is that the keyboard may become an obstacle to doing work on the PC when using an input terminal other than the keyboard, such as a mouse, light pen, voice recognition input device or controller for a game machine, because the keyboard occupies the desktop space in front of the display monitor at all times.

Further problems occur that require additional desk-top space, when the operator needs to transcribe a display output to paper, to operate the keyboard to input information directly from reference materials, such as data materials or operation manuals, used for input operation or to check the display output over the reference materials used. In each of these situations, an open space available beside the keyboard is usually used. However, when the open space beside the keyboard is used for working as described above, the operator must look back and forth between the display monitor and the transcribed matter/reference material such that the operator's work will not be efficient and will often cause eye fatigue. All the problems described above may be resolved by utilizing the keyboard space whenever necessary.

In order to use the desktop space efficiently, it is a usual practice that things necessary to work are taken out or drawn toward the operator on the desktop in preparation for working and are subsequently put aside when the work is complete. In the meantime, the keyboard which is one of the tools having movable size and weight is actually seldom cleared away, regardless of the problems it creates as described hereinbefore. The reason the keyboard is not put aside is not because it is unnecessary to do so, but because a prior keyboard is not equipped with a clearing-away capability that enables it to be cleared away by a simple operation when necessary.

SUMMARY OF THE INVENTION

The input operation of the keyboard is performed by tapping arrays of keys of many letters and symbols. Thus, each key face is restricted within a given size range from the standpoint of input operational requirements, and therefore, the minimum requisite size of the keyboard has to be maintained. For these reasons, it is not easy to attain space savings or realize a compact structure for the keyboard while keeping the efficiency of its input operation.

The present invention enables the efficient use of desktop space and the efficient input operation by realizing the space saving for the keyboard by a simple and economical means that does not involve reducing the size of the keyboard. In other words, the keyboard occupies the keyboard space on the desktop when it is being used in an input operation and thereby maintains the efficiency of its input operation, and the keyboard is placed in a standing position when additional space on the desktop is required.

In addition to the above, the present invention facilitates entry of data from reference materials during the input operation, as well as proofreading the input result with the reference material after the input operation, by positioning the reference material in the best position from which to read them while utilizing "dead" desktop space efficiently.

A stand gear of the present invention is arranged and structured so as to be easily attachable to a stand-alone type keyboard and allows a user at any time to reduce the space occupied by the keyboard by utilizing the standing capability imparted to the keyboard by the stand gear. In particular, the stand gear allows a user to make available an open space on the desktop where the keyboard was sitting originally, which is the most efficient place on the desk to do work, by performing the operation of standing or returning the keyboard to the desktop as necessary. Thus, when the keyboard is not used in an input operation or the space occupied by the keyboard is required for another use, the keyboard can be set aside in its standing position. As a result, the present invention provides a means to enable more efficient use of the desktop space and realizes the efficient input operation of the PC on a desktop of limited space.

In addition to the efficient use of the desktop space, the present invention provides reduced eye fatigue and efficient reading when the stand gear is combined with a stand mechanism for holding reference materials.

The construction and function of the stand gear will be described hereinafter. Three components of the present invention include, a stand base and a support arm which constitute the stand gear and a keyboard. The three components are linearly arranged and coupled, so as to be pivotally connected with each other. In such construction, the two endmost components, which are pivotally connected at their respective ends to the other component between them, contact each other so as to form a triangular structure having sides constituted by the respective components, including a base constituted by the stand base.

A stopping means is provided on the stand base which is one of the two components in contact with each other. Then the other contacting component, constituted by either the keyboard or the stand arm, is stopped by the stopping means wherein the two components in a stopped relationship are connected, thereby causing a closed triangle of force to be formed by the three components. Thus, if the stand base is disposed on a desk, the keyboard as one of the three components is held in its standing position on the desk.

For a keyboard which does not have a pivotal connection mechanism as described hereinbefore, holders having the pivotal connection mechanism are fixedly provided on the keyboard and the keyboard is connected pivotally to the stand arm through the holders.

When the components fixedly connected by the stopping means of the stand base are released and folded flat, the stand base and stand arm are housed behind or in the back of the keyboard, and the keyboard is transformed for an inputting operation or the lying state.

Since the stand gear according to the present invention is constructed by the linkage described above, an operator does not have to pick up the whole weight of the keyboard when he stands it up and returns it to its ready position. The operator of the keyboard can operate it swiftly and readily if he repeats these "put-it-aside" and "put-it-back" operations and can also operate it by handling just the keyboard.

The stand gear may also be constructed so that the tilt angle of the keyboard in its standing position is adjustable and the keyboard in its standing position is easily movable on the desktop. Also, the stand gear may be constructed so as to stand the keyboard upside down or invert it on the desk by similar operation as described hereinbefore with reference to the standing operation. Further, the interior decorativeness of the keyboard in the inverted position may be enhanced by designing the back of the keyboard to harmonize with the atmosphere of the room when the PC is used at home or the like.

Additionally, a paper stand board for standing and holding reference materials is attached to the stand gear so as to locate it between the display and the keyboard, thereby enabling the materials it holds to be read most efficiently over the input operation. The location of the reference material is optimal for an operator to efficiently read it because the operator can read the reference material with minimum eye movement when it is necessary to look from the monitor display, the keyboard and/or the reference paper one after another.

Also, the location of the paper stand board is usually within a "dead" desktop space and thus the paper stand board results in efficient space utilization. The paper stand board may be constructed so as to be detachable from the stand gear whenever necessary or with an adjustable tilt angle.

DETAILED DESCRIPTION OF THE PREFERRED EMBODIMENTS

Various embodiments of the present invention will be described in detail hereinafter by referring to the drawings.

In FIGS. 1 through 6, a stand gear comprises a stand arm 10, made by bending a spring steel rod of about 3 mm in diameter into a nearly C-like shape, and a stand base 20, made of molded plastic, having a stopping means 21 comprised of a projection. A rotational shaft portion 11 of stand arm 10 is fitted in a U-like shaped groove 22, formed at the back of stand base 20, so as to be rotatably held in the U-shaped groove 22 with bearing blocks 23a and 23b which are fitted therein afterwards, thereby pivotally connecting stand base 20 to stand arm 10.

Support shaft portions 13a and 13b, each of which is a bent open end of either arm shaft portion 12a or 12b of stand arm 10, are inserted into respective bearing holes 31a and 31b bored in a pair of left and right holders 30a and 30b, so that stand arm 10 is rotatably held by holders 30a and 30b. Each of holders 30a and 30b is attached on one of the left and right side faces 3a and 3b of keyboard 1 by inserting a pair of guide nails 32 of holders 30a and 30b into each of side faces 3a and 3b, and is stuck thereon with an adhesive sheet or bond.

Holders 30a and 30b should be fixed to respective side faces 3a and 3b substantially at the midpoints thereof, so that keyboard 1 in its standing position is stably held and the desktop space occupied by keyboard 1 mounted on the stand gear is reduced as much as possible.

Figure 1:
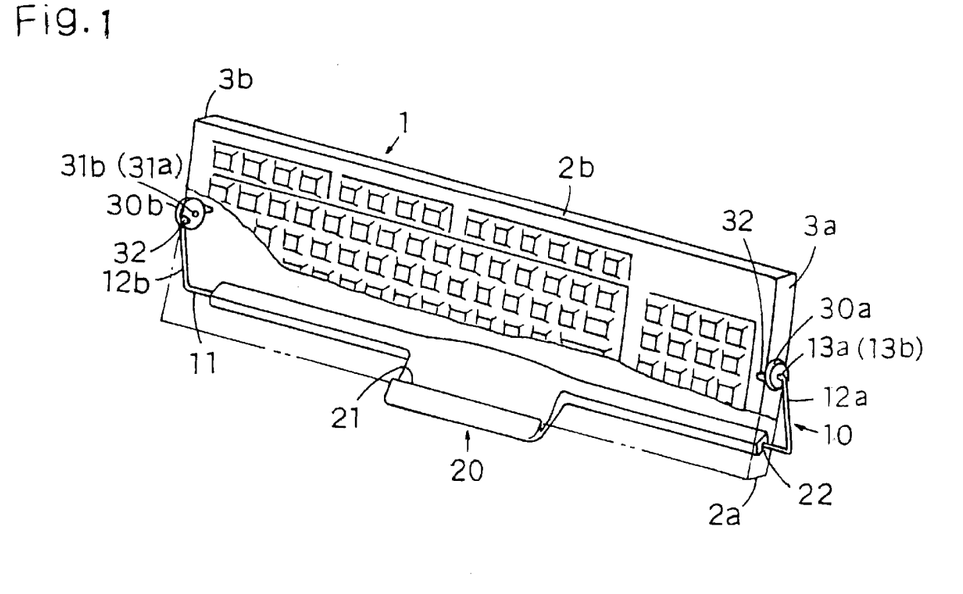
FIG. 1 is a perspective view of a stand gear of the present invention attached using holders to both sides of a keyboard in a standing position.
Figure 2:
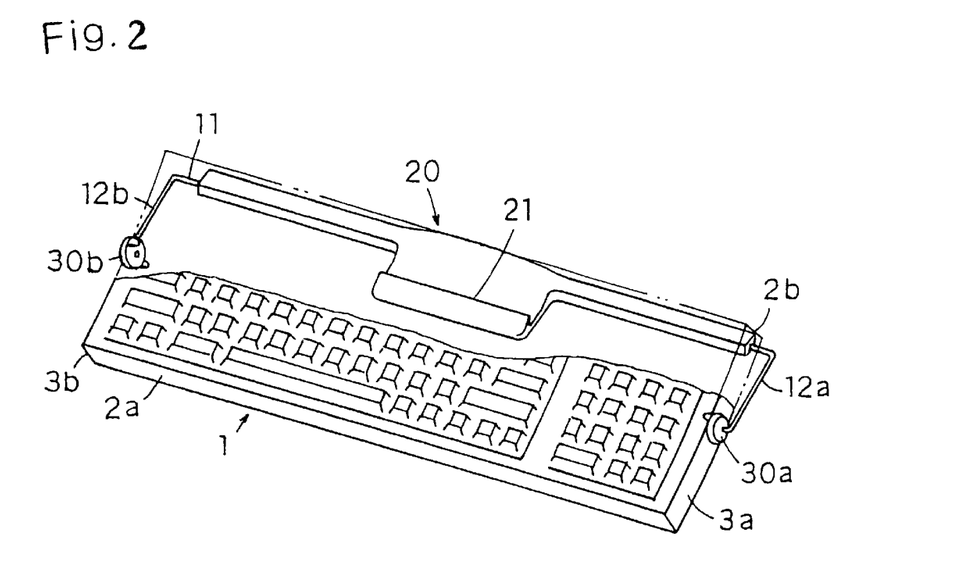
FIG. 2 is a perspective view of a stand gear of the present invention attached using holders to both sides of a keyboard in a lying position ready to operate.

Referring to FIG. 1, keyboard 1 is shown in its standing position mounted on the stand gear. When keyboard 1 is raised so as to place a front face 2a thereof on stand base 20, front face 2a is stopped by stopping means 21, whereby keyboard 1 is held in its standing position. Referring to FIG. 2, keyboard 1 is shown ready for input operation, in other words, in its lying position.

Figure 5:
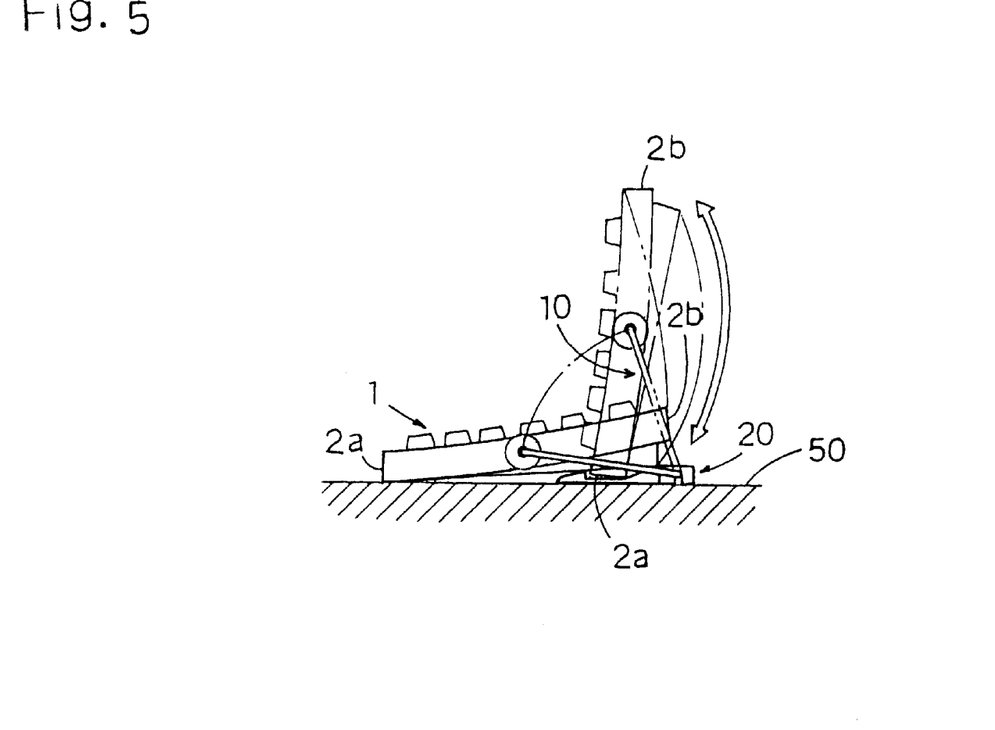
FIG. 5 is a side view of a keyboard, to which a stand gear of the present invention is attached, showing the motion of the keyboard by the stand operation.

As illustrated in FIG. 5, to change the position of keyboard 1 as shown in FIG. 2 into that shown in FIG. 1, an operator picks up keyboard 1 in both hands and continuously pushes keyboard 1 so that a rear face 2b thereof is gradually raised. Once keyboard 1 reaches its standing position, front face 2a thereof is placed on stand base 20 to be stopped by stopping means 21. To return keyboard 1 from its standing position to its original position, the operator lifts keyboard 1 just enough to release stopping means 21 and the operation described hereinbefore is then followed in the reverse order.

During the standing operation described above, keyboard 1 may be moved so as to make the weight thereof be carried by arm shaft portions 12a and 12b of stand arm 10 thereby reducing the load of keyboard 1 on the operator's hands.

Figure 3:
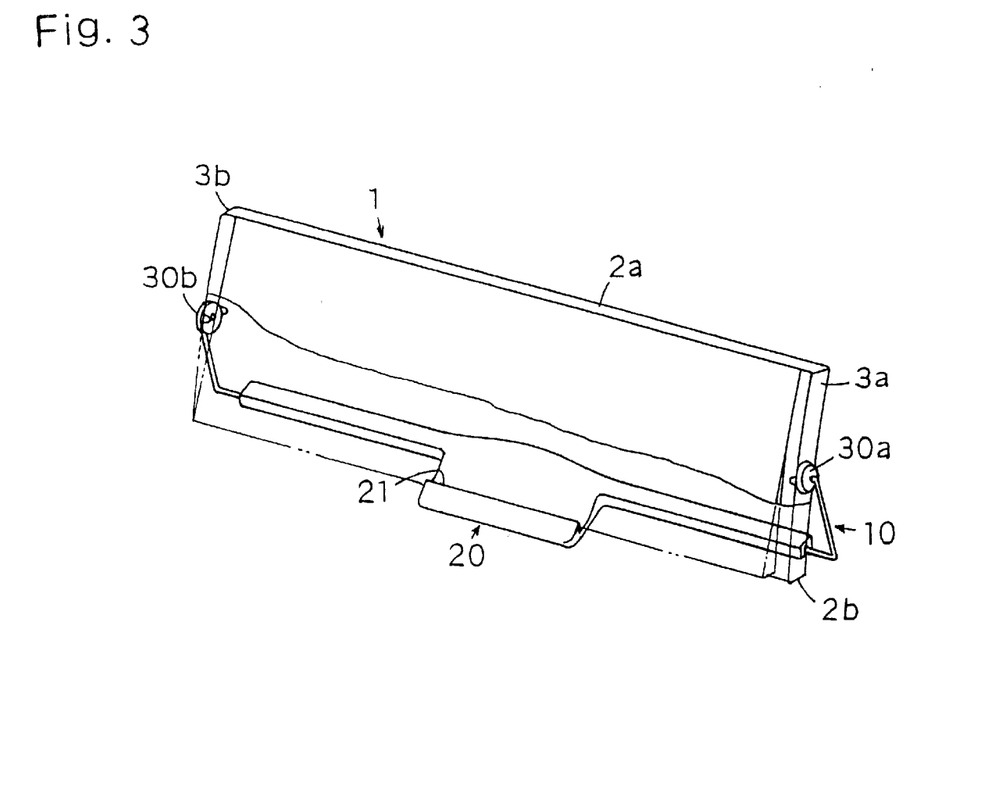
FIG. 3 is a perspective view of a stand gear of the present invention attached using holders to both sides of a keyboard in a reverse-standing position.
Figure 4:
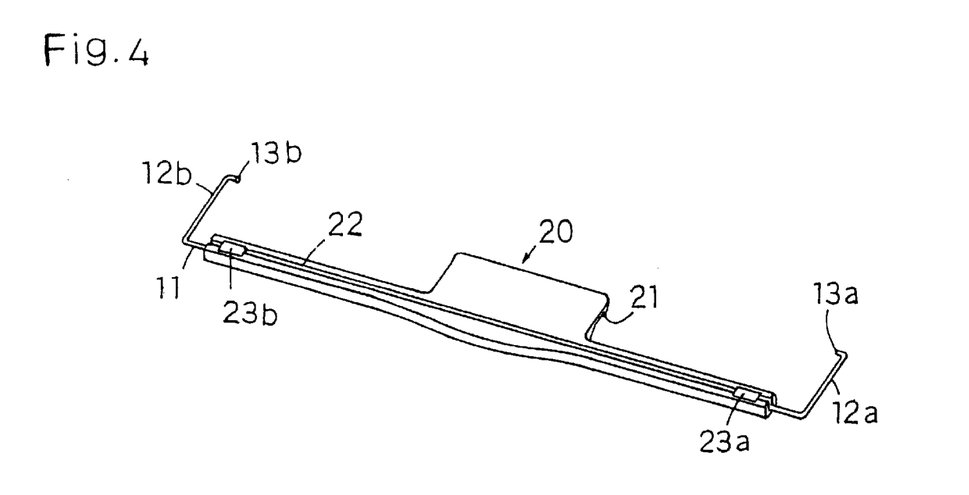
FIG. 4 is a perspective rear view of a stand base on which a stand arm is mounted.
Figure 6:
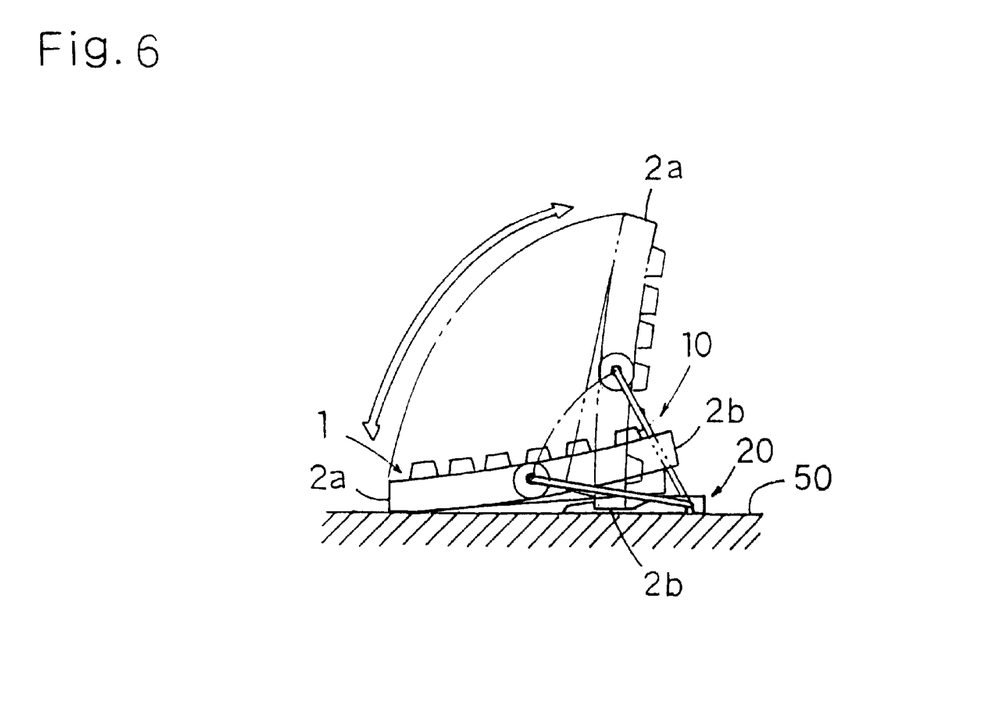
FIG. 6 is a side view of a keyboard, to which a stand gear of the present invention is attached, showing the motion of the keyboard by the reverse-stand operation.

In addition, a stand gear constructed in accordance with the present invention enables keyboard 1 to be inverted as shown in FIGS. 3 and 6. In this case, to change the position of keyboard 1 shown in FIG. 2 to that shown in FIG. 3, keyboard 1 is inverted by lifting the front face 2a thereof so as to slide the rear face 2b thereof onto stand base 20 and stopping front face 2a by stopping means 21. To return keyboard 1 to its original position, the operation described above is performed in the reverse order.

In the construction described above, when the stand gear is not in use holders 30a and 30b and arm shaft portions 12a and 12b are the only portions thereof visible. The remaining portions of the stand gear are hidden behind or beneath the keyboard. Hence, the stand gear does not obstruct either the work space on the desk or the appearance of the desk, and people are hardly aware that the stand gear is attached to the keyboard.

Due to appropriately setting the mounting positions for holders 30a and 30b on respective side faces 3a and 3b of keyboard 1 and to the dimensional relationship between the rotation radius of arm shaft portions 12a and 12b of stand arm 10 and the length and depth of stand base 20, keyboard 1 in a standing position is stably held on stand base 10. The present invention substantially prevents keyboard 1 from easily falling down even if it is stood nearly upright, thereby ensuring a greater reduction of space occupied by the standing keyboard and also making the keyboard in standing position operational to input, if the key input operation is simple and light.

When keyboard 1 is inverted, i.e., facing the back to front, the key faces thereof are hidden behind, thereby bringing the desirable effect of protecting the keys from erroneous keying and dust.

Figure 7:
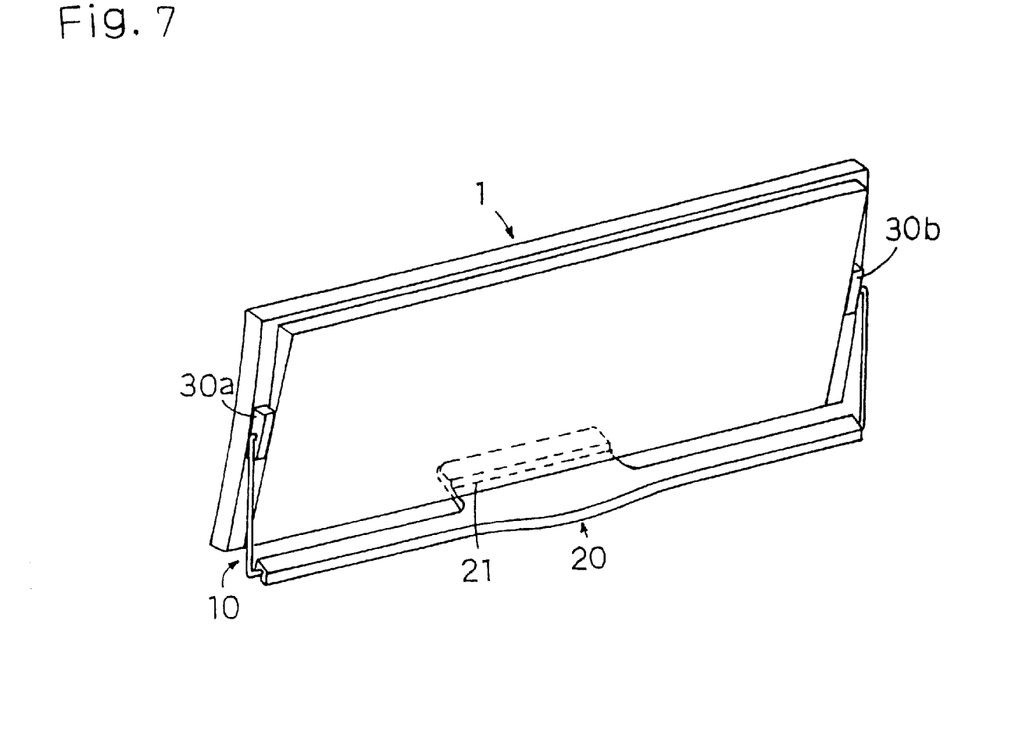
FIG. 7 is a perspective view of a stand gear of the present invention attached using holders to the back of a keyboard in a standing position.

Referring to FIG. 7, there is shown a stand gear attached to keyboard 1 through a pair of holders 30a and 30b fixed on the back of keyboard 1. All parts of the stand gear are hidden behind or beneath keyboard 1 all the time, whereby the stand gear is neither a physical obstacle nor eyesore.

Figure 8:
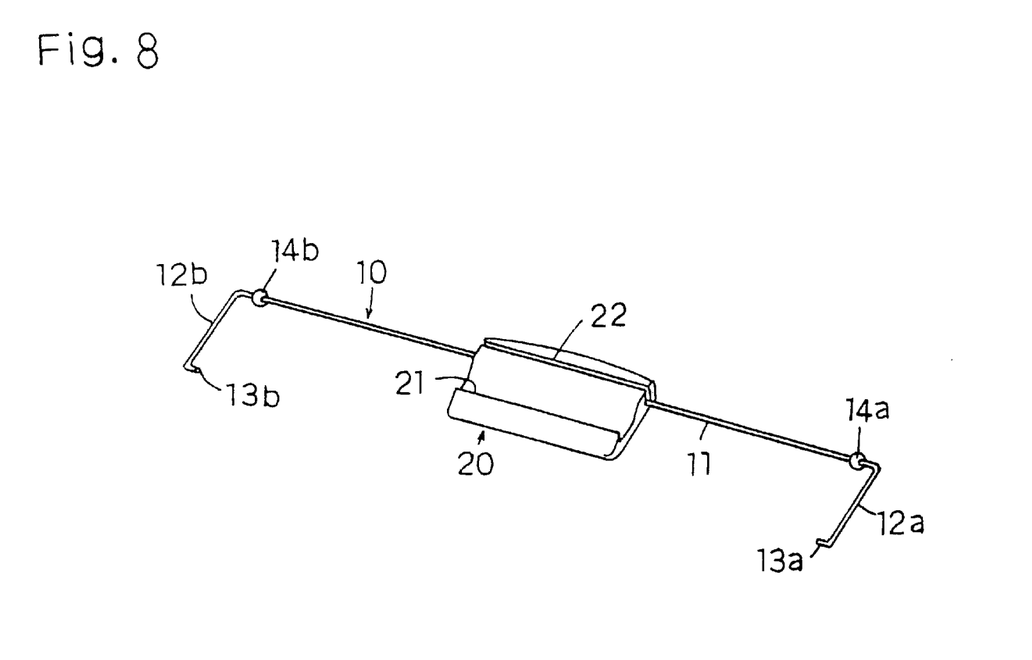
FIG. 8 is a perspective view of a stand base of another embodiment on which a stand arm is mounted.

Referring to FIG. 8, there is shown one embodiment of stand base 20 that is provided at an upper surface with sectionally U-like shaped groove 22 in which rotational shaft portion 11 is rotatably held in shorter span. Stand-offs 14a and 14b made of ball-shaped molded plastic are mounted on both ends of rotational shaft portion 11 and are provided for reducing the burden of rotational shaft portion 11, when rotational shaft 11 has a longer span which is loaded by the weight of keyboard 1 during the standing operation.

Figure 9:
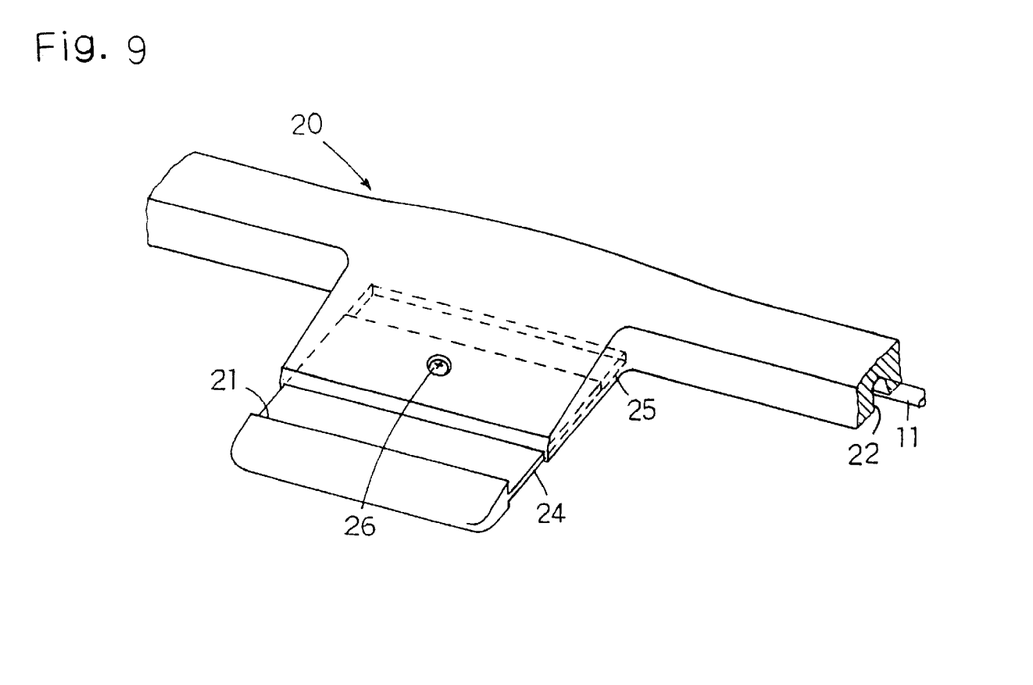
FIG. 9 is a perspective view of a stand base having a slide portion to make a location of a stopping portion thereof adjustable.

Referring to FIGS. 9 through 12, there are shown several embodiments of stopping means 21 of stand base 20. In FIG. 9 stand base 20 is divided into two parts, one of which constitutes stopping means 21 having a slide plate portion 24 and the other of which comprises sectionally U-like shaped groove 22 for rotatably holding rotational shaft portion 11 and a slide guide portion 25 that is constructed and arranged so that slide plate portion 24 is allowed to slidably move therein. Stopping means 21 of stand base 20 moves perpendicular to rotational shaft portion 11 by moving stopping means 21 so as to set the keyboard at a desired tilt angle and fastening it by set screw 26. In this position, the keyboard can be stood at an easily operable tilt angle so that the input operation may be performed while the keyboard is standing.

Figure 10:
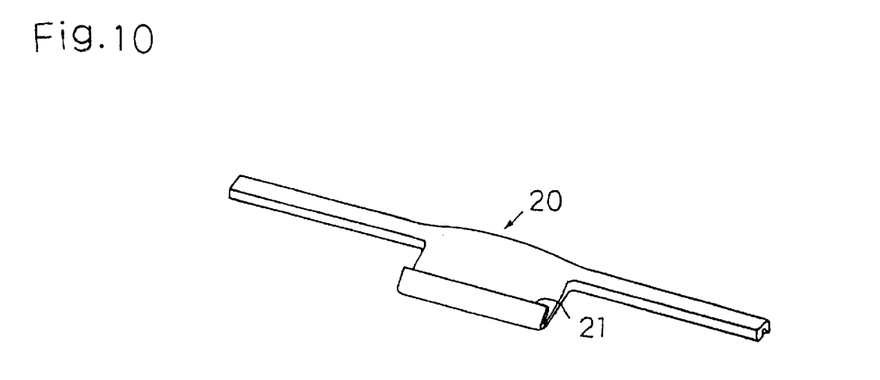
FIG. 10 is a perspective view of a stopping means of a stand base of another embodiment.

In FIG. 10, stopping means 21 of stand base 20 is made of a bent thin plastic plate that is constructed so as to be allowed to swing vertically, like a flat spring, when an external force is applied in a vertical direction. Stopping means 21 not only functions to stop and hold the standing keyboard, but also functions to absorb the shock of the keyboard hitting against stand base 20 with its spring force by being arranged so that the back of the keyboard contacts stopping means 21 first when the standing keyboard is laid down.

Figure 11:
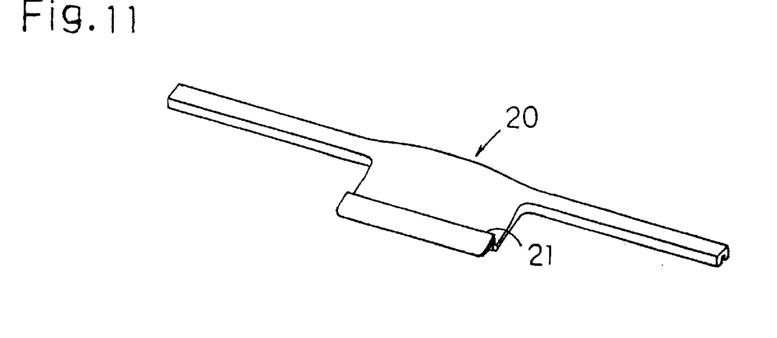
FIG. 11 is a perspective view of a stopping means of a stand base according to another embodiment.

In FIG. 11, stopping means 21 of stand base 20 is made of a thin plate of elastic material, for example, a plastic formed in the shape of a wave may be constructed so that a keyboard placed at the bottom portion of wave-shaped stopping means 21 is stopped by the crest portion of stopping means 21. When a keyboard is raised from its lying position such that the front face thereof is slid on the desk until it hits stopping means 21, wave-shaped stopping means 21 is loaded by the weight of the keyboard and is compressed and deformed elastically on the desk. The operator continues to push the keyboard over the crest portion of compressed and deformed stopping means 21 until the keyboard reaches the bottom portion of stopping means 21, wherein elastically deformed stopping means 21 is restored to its original state thereby stopping the front face of the keyboard. The use of stopping means 21 with the stand gear hardly requires the keyboard to be lifted when it is placed in the standing position, thereby reducing the load of the keyboard on the operator.

Figure 12:
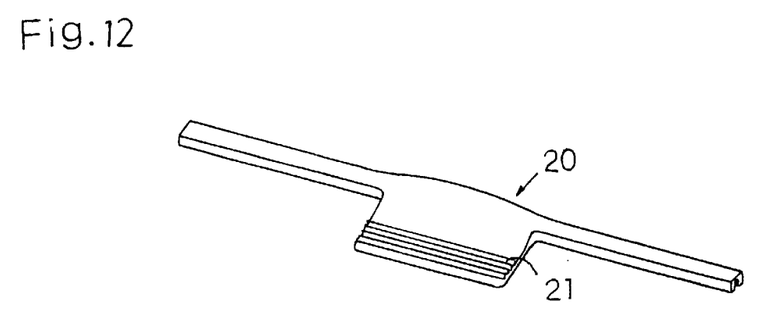
FIG. 12 is a perspective view of a stopping means of a stand base according to another embodiment.

In FIG. 12, stopping means 21 of stand base 20 forms a plurality of grooves in the shape of the teeth of a saw. In this case, the tilt angle of the standing keyboard becomes adjustable by changing the groove in which the standing keyboard is secured because each groove has the same effect of stopping the keyboard. If stopping means 21 is made of elastic material, for example, rubber, the mechanical shock generated during the standing operation can be absorbed.

Figure 13:
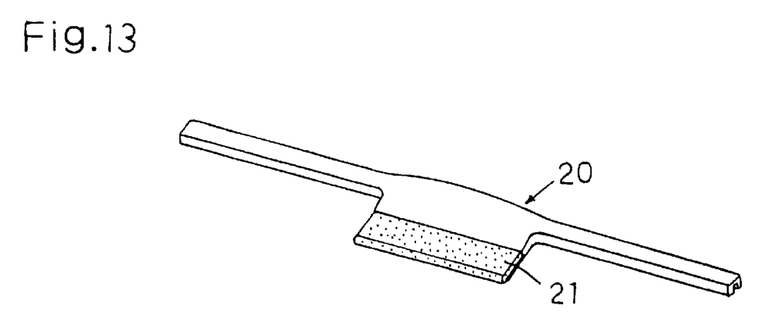
FIG. 13 is a perspective view of a stopping means of a stand base according to another embodiment.

In FIG. 13, stopping means 21 of stand base 20 is formed from sponge or sponge-like material. When a keyboard is stood on this stopping means 21, only a part of stopping means 21 in contact with the keyboard gets sunk or depressed by the weight of the keyboard, whereby the keyboard is stopped at the depressed part. In this case, a shock absorbing effect can be also expected when the keyboard is stood and placed in stopping means 21.

Referring to FIGS. 14 through 17, there are shown other embodiments of holders 30a and 30b.

Figure 14:
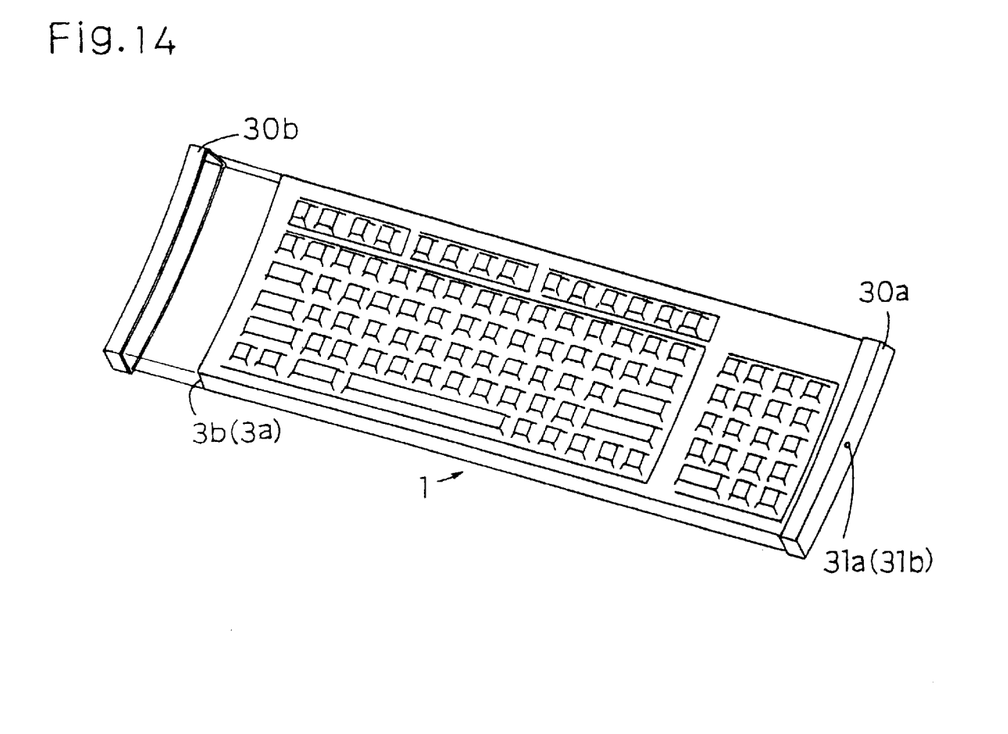
FIG. 14 is a perspective view of holders mounted on a keyboard according to another embodiment.

In FIG. 14, a pair of holders 30a and 30b are cap-shaped so that they can be fixedly mounted on keyboard 1 by putting them on respective side faces 3a and 3b. In this case, holders 30a and 30b fixed to keyboard 1 can be easily detached at any time because of they are affixed without using adhesive sheets, bond or the like.

Figure 15:
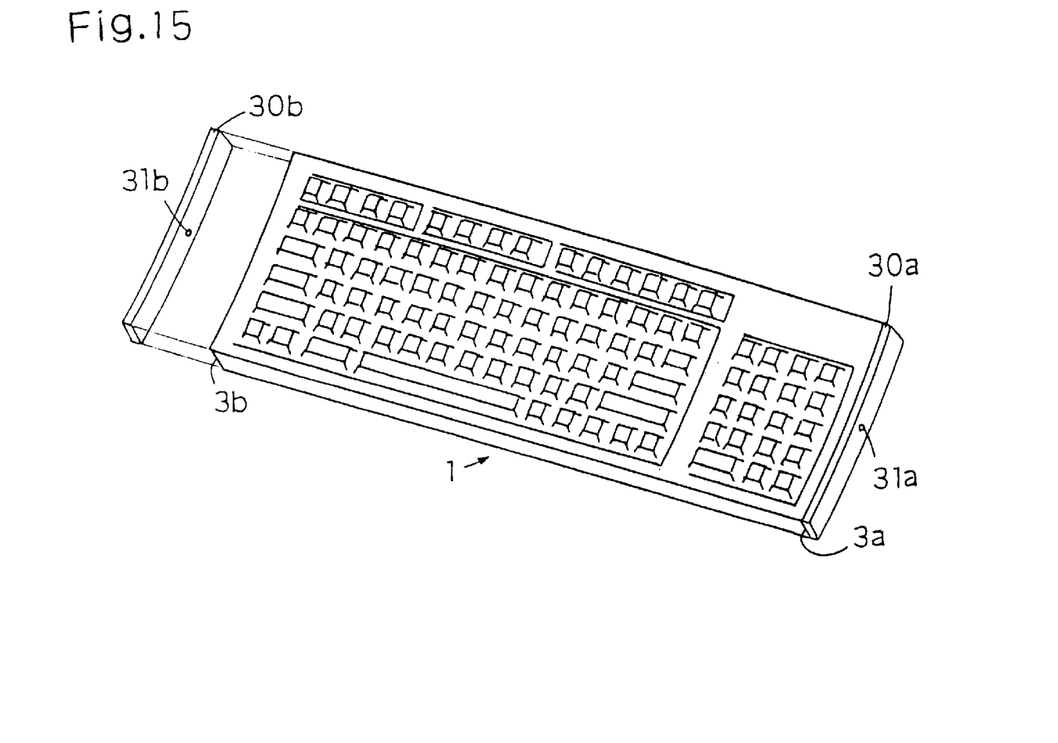
FIG. 15 is a perspective view of holders mounted on a keyboard according to another embodiment.

In FIG. 15, a pair of holders 30a and 30b, which are made of plastics plates having the same sizes as side faces 3a and 3b of keyboard 1, are affixed to side face 3a and 3b by using adhesive sheets or bond. Due to the size of holders 30a and 30b and the manner in which they are mounted on side faces 3a and 3b, holders 30a and 30b are not obtrusive, thereby hardly giving the feeling of incongruity.

Figure 16:
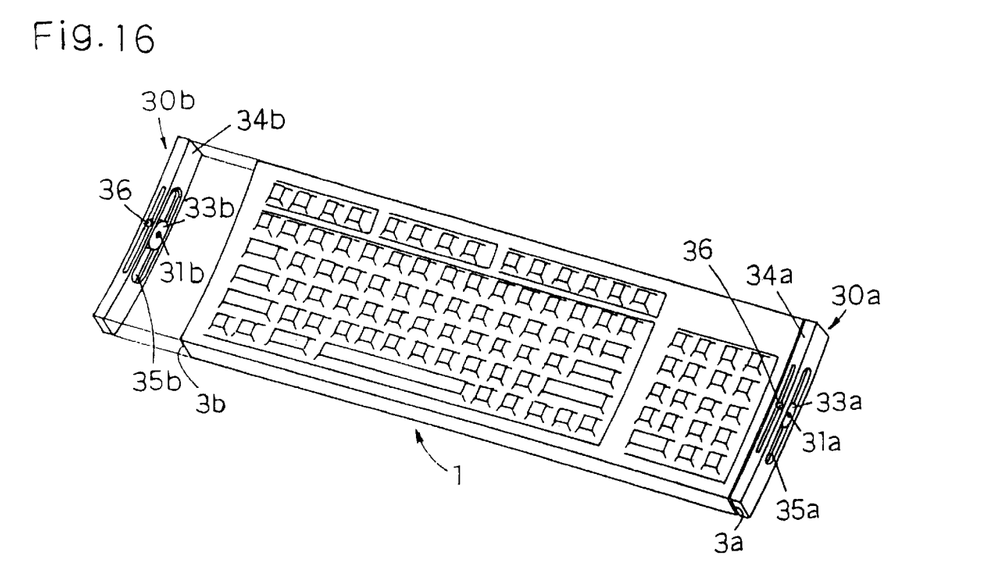
FIG. 16 is a perspective view of holders mounted on a keyboard to make a location of a bearing hole adjustable.
Figure 17:
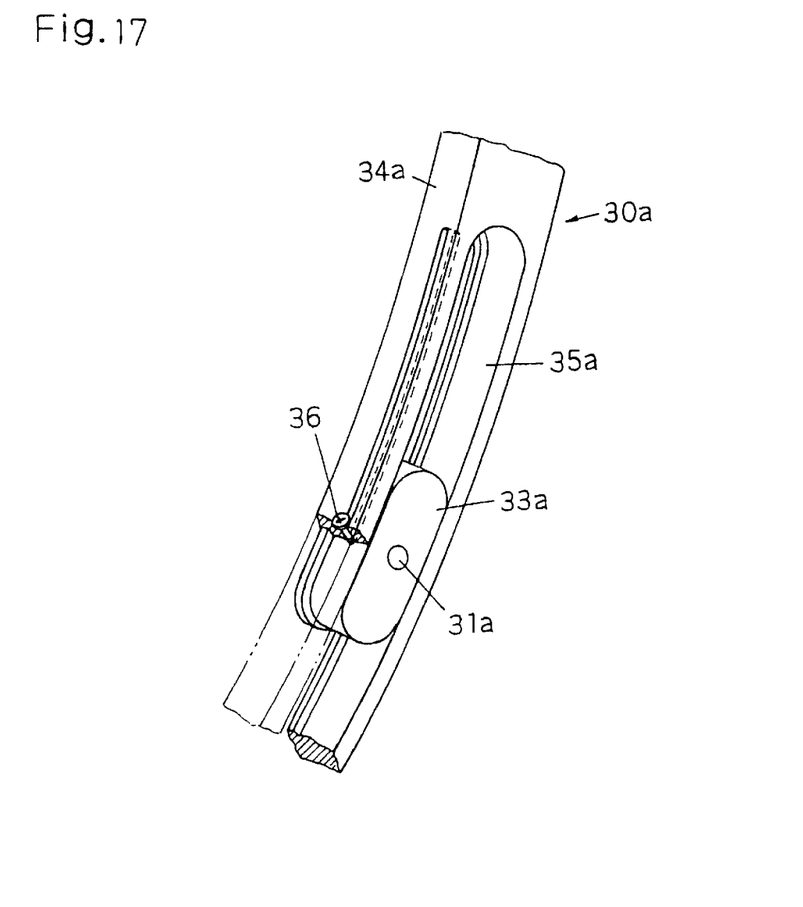
FIG. 17 is perspective view of a holder 30a shown in FIG. 16.

In FIGS. 16 and 17, a pair of holder 30a and 30b are provided with guide plates 34a and 34b having guide holes 35a and 35b and with slide blocks 33a and 33b having bearing holes 31a and 31b, respectively. Guide plates 34a and 34b are affixed to respective side faces 3a and 3b of keyboard 1 with an adhesive sheet or bond. Slide block 33a and 33b are slidably fitted in respective guide holes 35a and 35b. The support shaft portions of the stand arm are inserted into bearing hole 31a and 31b for attaching the stand gear. Thus, the tilt angle of the keyboard in standing position may be changed with a corresponding change in the position of slide blocks 33a and 33b in respective guide holes 35a and 35b, so that the tilt angle thereof can be adjusted by moving slide blocks 33a and 33b.

Keyboard 1 is held in its standing position at a certain tilt angle by fitting set screws 36 so as to stop slide blocks 33a and 33b from moving in guide holes 35a and 35b respectively. Alternatively, set screw 36 may be replaced with a brake mechanism actuated by a finger tip so as to make the tilt angle of the keyboard adjustable while the keyboard is standing.

Referring to FIGS. 18 through 21, there is shown an embodiment of a stand gear constructed so as to be combined with detachable paper stand board 40.

Figure 18:
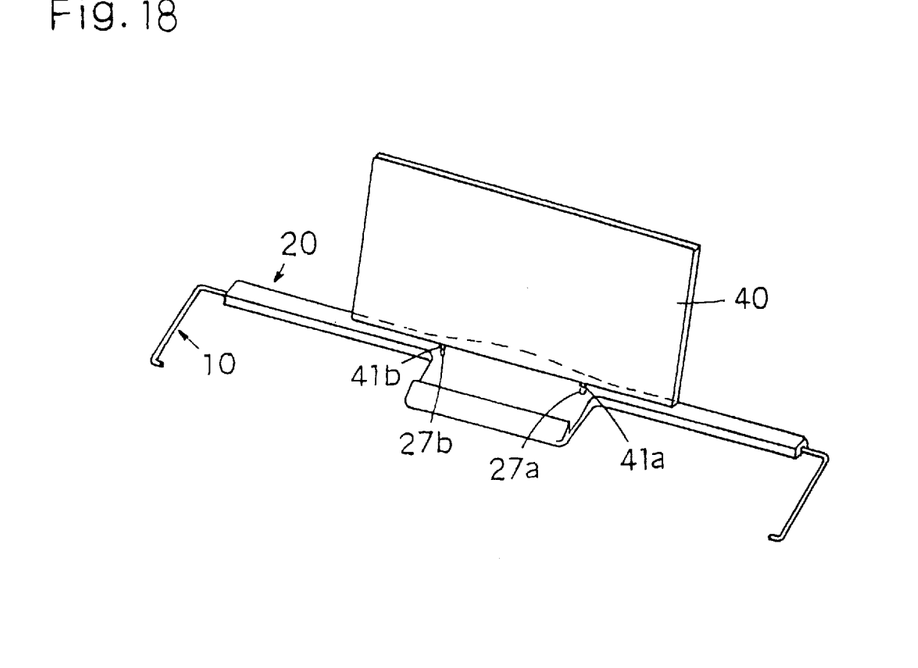
FIG. 18 is a perspective view of a stand gear showing a stand base on which a paper stand board is mounted.
Figure 19:
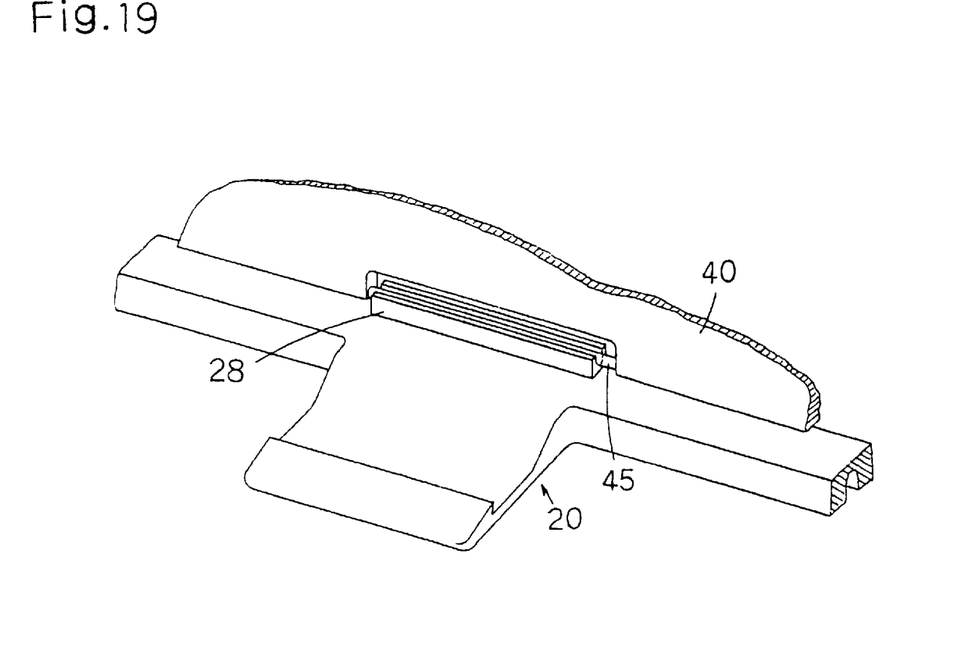
FIG. 19 is a perspective view of a main portion of a stand gear showing a rotational bearing portion of a stand base on which a paper stand board is mounted.
Figure 20:
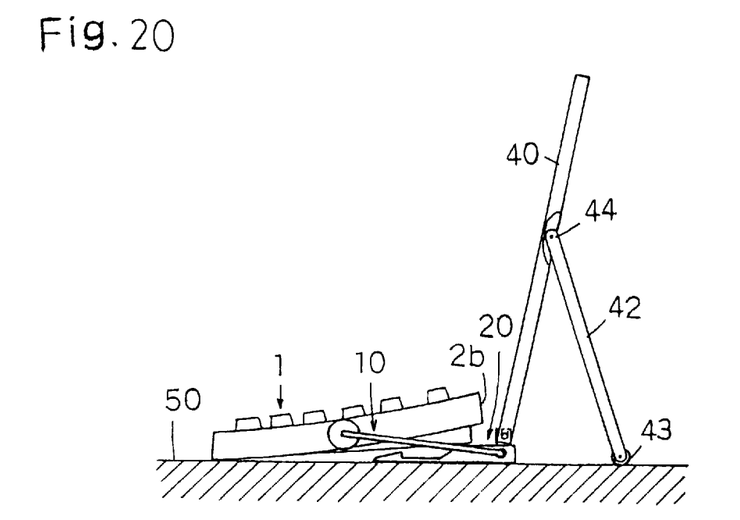
FIG. 20 is a perspective view of the embodiment shown in FIG. 19 on which a keyboard is mounted.

In FIG. 18, paper stand board 40 is mounted in its standing position on stand base 20 by inserting respective stud pins 41a and 41b provided on a bottom side of paper stand board 40 into a pair of stud holes 27a and 27b bored in stand base 20. In FIGS. 19 and 20, paper stand board 40 is provided at the center or near the center of the bottom side thereof with a rotational support shaft 45 in parallel to the bottom side. A rotation shaft bearing 28 having a sectionally U-like shaped groove is mounted on stand base 20 so as to retain rotational support shaft 45. A pair of free ends of a substantially C-like shaped board stand 42 are rotatably attached to the base of paper stand board 40 through respective pins 44.

Rotational support shaft 45 is fitted in the sectionally U-like shaped groove of rotational shaft bearing 28 and paper stand board 40 is loaded on stand base 20, thereby rotatably holding paper stand board 40 on rotational shaft bearing 28. In addition, cylindrical nonskid stopping means 43 made of rubber having a rough surface is provided on board stand 42 where it is in contact with a desktop 50 so as to increase a frictional resistance to desktop 50, whereby board stand 42 is stopped and held on desktop 50.

Due to the construction as described hereinbefore, paper stand board 40 can be held stably by rotational shaft bearing 28 and board stand 42. Further, the tilt angle of said paper stand board 40 can be changed easily within a certain range by sliding nonskid stopping means 43 back and forth on desktop 50 while paper stand board 40 is stood on rotational shaft bearing 28.

Furthermore, the reference material standing against paper stand board 40 does not slide down because it is caught and supported between paper stand board 40, rear face 2b of keyboard 1 and stand base 20. Even if the reference material is a thick book like a manual, the opened book can be held.

Figure 21:
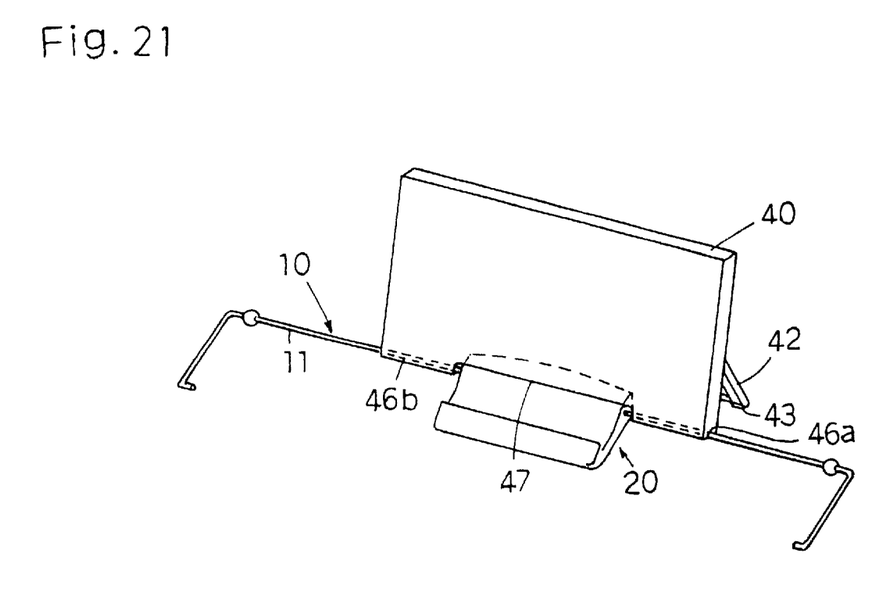
FIG. 21 is a perspective view of a paper stand board mounted on a stand arm.

Referring to FIG. 21, there is shown another embodiment of the invention which is constructed so that paper stand board 40 is held pivotally on rotational shaft portion 11 of stand arm 10. Paper stand board 40 is provided on both side of the bottom face thereof with sectionally U-shaped grooves 46a and 46b respectively and at the center of the bottom face thereof with notch means 47 so as to avoid interference with stand base 20. Paper stand board 40 is arranged and constructed in the same way as the embodiment described in detail with respect to FIGS. 19 and 20 except for the construction as described above. When such paper stand board 40 is stood to be held pivotally by fitting grooves 46a and 46b in rotational shaft portion 11 of stand arm 10, the effects similar to the ones in the embodiment described hereinbefore can be obtained.

Referring to FIGS. 22 through 25, there are shown embodiments of a keyboard provided with standing mechanisms.

Figure 22:
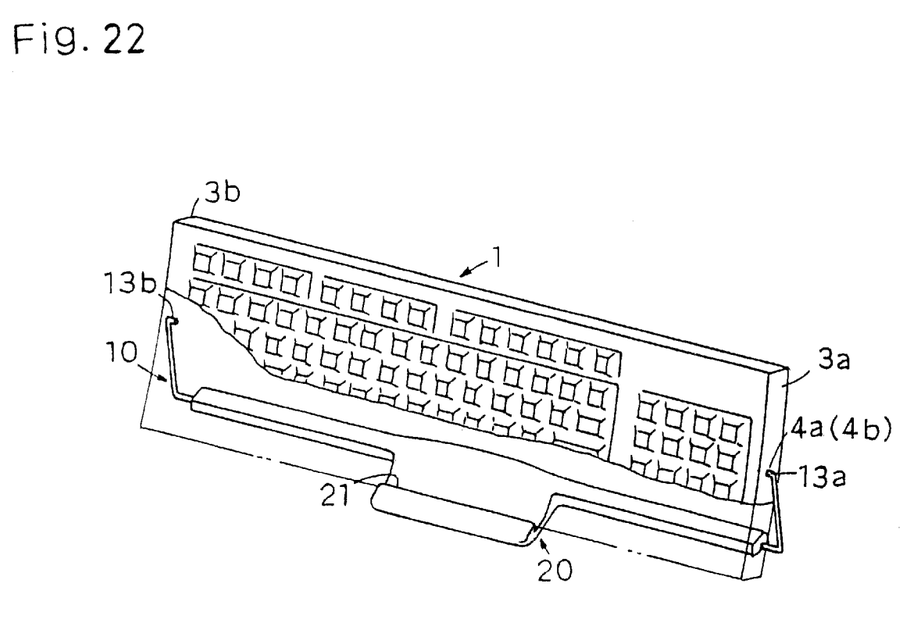
FIG. 22 is a perspective rear view of a keyboard equipped with a stand gear according to an embodiment of the present invention.
Figure 23:
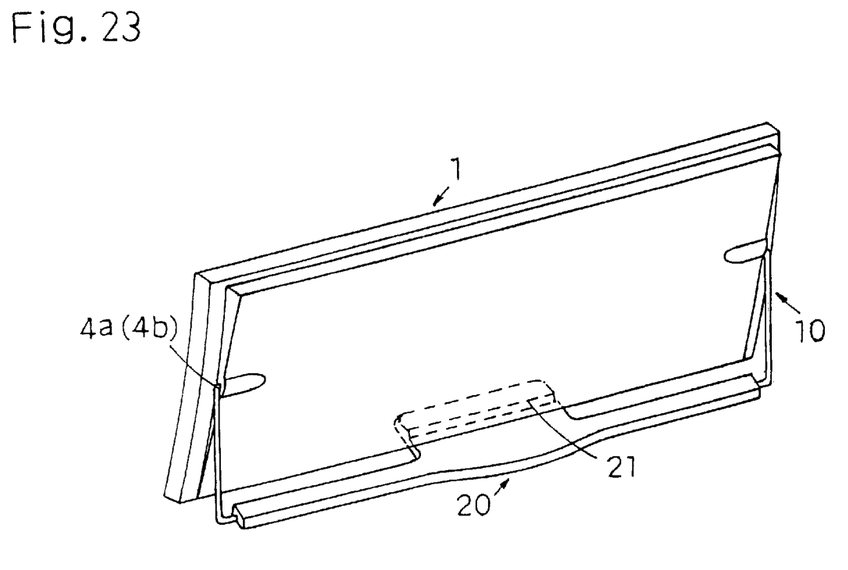
FIG. 23 is a perspective rear view of a keyboard equipped with a stand gear according to another embodiment of this invention.

In FIGS. 22 and 23, keyboard 1 is provided either at its side faces 3a and 3b or its back with a pair of bearing holes 4a and 4b into which support shaft portions 13a and 13b of stand arm 10 are fitted, thereby attaching a stand gear comprising stand base 20 and stand arm 10 to keyboard 1. The benefits of this embodiment of the stand gear to keyboard 1, as illustrated in FIGS. 22 and 23, are identical to the ones for keyboard 1 shown in FIGS. 1 and 7 respectively, except for the position of the holders 30a and 30b.

Figure 24:
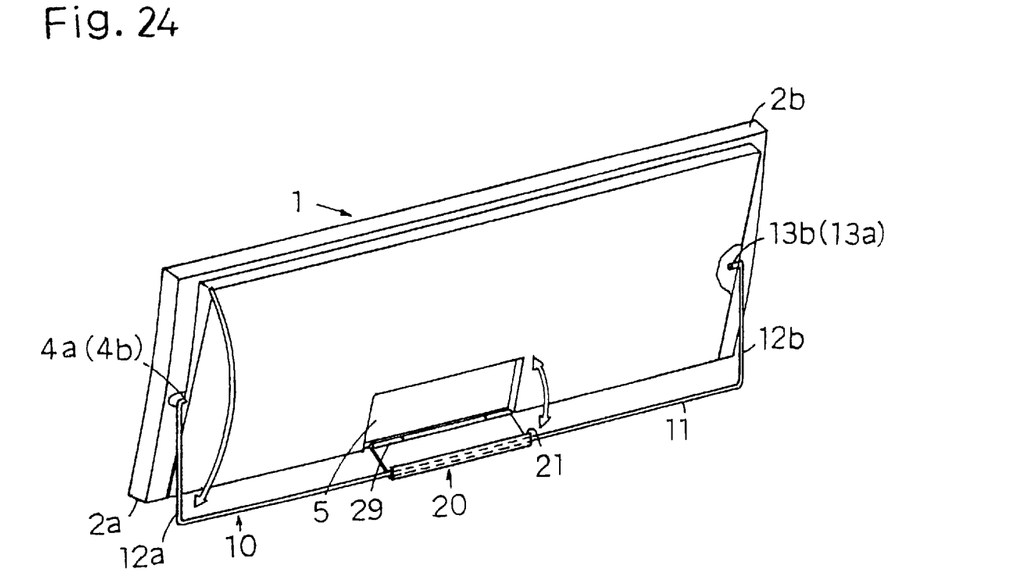
FIG. 24 is a perspective rear view of a keyboard equipped with a stand gear according to another embodiment of this invention.

In FIG. 24, keyboard 1 is constructed so that support shaft portions 13a and 13b of stand arm 10, which are formed by bending a spring steel rod of about 3 mm in diameter to a nearly C-like shape, are fitted pivotally in a pair of bearing holes 4a and 4b provided on the back of keyboard 1. Stand base 20 made of a plastic or steel plate which is bent at its one end so as to form stopping means 21 and is provided at the other end thereof with a hinge connection 29, is connected in hinged relationship in the neighborhood of front side 2a of keyboard 1, whereby it opens and closes in accordance with standing and laying-down movements of keyboard 1 as indicated by an arrow.

When keyboard 1 so constructed is laid down on a flat surface, the whole of stand base 20 is housed in a pit 5 provided in the back of keyboard 1, and stand arm 10 is also housed in the back of keyboard 1 after making a rotational movement toward rear face 2b. When keyboard 1 is raised and stood on front face 2a from the laying-down state of keyboard 1, arm shaft portions 12a and 12b of stand arm 10 rotate following its stand operation as indicated by an arrow, i.e., rotational shaft portion 11 moves from the side of rear face 2b toward stopping means 21 of stand base 20 and finally reaches the side of front face 2a after getting over stopping means 21. Ceasing the stand operation at this point of time, rotational shaft 11 is stopped by stopping means 21 and the standing state of keyboard 1 is kept as illustrated in FIG. 24.

In order to return keyboard 1 in standing position to its original position, arm shaft portions 12a and 12b of stand arm 10 are lifted a little while holding keyboard 1 with both hands so as to release the stopping of rotational shaft portion 11 against stopping means 21 and keyboard 1 is laid down. Stand arm 10 and stand base 20 are automatically closed according to this operation.

Figure 25:
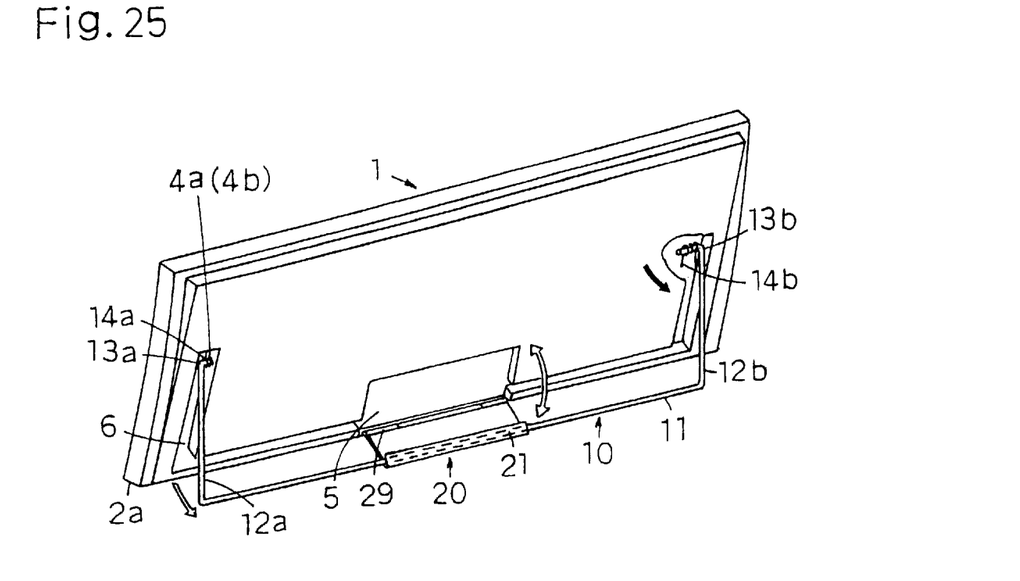
FIG. 25 is a perspective rear view of a keyboard equipped with a stand gear according to another embodiment of this invention.

In FIG. 25, the construction of keyboard 1 is similar to that shown in FIG. 24, and the construction of stand base 20 is identical between FIG. 24 and FIG. 25. Stand arm 10, made to be movable within the limit of length of said stand base 20, is housed as a whole in a channel groove 6 when keyboard 1 is laid down on a flat surface. Spring means 14a and 14b are provided on respective support shaft portions 13a and 13b of stand arm 10 so that the spring force of spring means 14a and 14b act at all time in the direction as indicated by the arrow in FIG. 25, i.e., in the direction for opening stand arm 10.

Once keyboard 1, as described in this embodiment, is stood on its front face 2a from the laying-down position of keyboard 1, arm shaft portions 12a and 12b of stand arm 10 rotate as indicated by the arrow in FIG. 25 following the stand operation described hereinbefore. Thus, rotational shaft portion 11 moves from the side of rear face 2b toward stopping means 21 of said stand 20, eventually reaches the side of front face 2a after getting over stopping means 21, whereby keyboard 1 is held in its standing position as shown in FIG. 25.

In order to return keyboard 1 in standing position to its original position, arm shaft portions 12a and 12b of stand arm 10 are drawn toward the back of keyboard 1 while holding keyboard 1 with both hands and keyboard 1 is laid down while releasing its stopping. Hence, stand arm 10 and stand base 20 are automatically closed according to the operation described hereinbefore.

Keyboard 1 in the embodiments described hereinbefore has a simple stand mechanism in construction, and is simple and readily operable. The keyboard is placed in a standing position by the minimum operation of raising and standing the keyboard. Furthermore, the stand mechanism is neither physically obtrusive nor an eyesore because it is not exposed completely in a front view of the keyboard.

If rotational shaft portion 11 of stand arm 10 is shortened, it is easily attainable to provide a stand gear which enables an operator to release the keyboard from stopping means 21 without directly touching arm shaft portions 12a and 12b or respective side faces 3a and 3b of keyboard 1.

What is claimed is:

1. A stand gear for a keyboard, comprising:
   a stand arm having a rotation shaft at one end thereof for connecting pivotally to the keyboard; and
   a stand base connected pivotally to said stand arm at another end of said stand arm, and said stand base having a stopping means for engaging with and stopping the keyboard when the keyboard is rotated into its standing position.

2. The stand gear for the keyboard as set forth in claim 1, wherein said stopping means of said stand base is movable so as to make a tilt angle of the keyboard in its standing position adjustable.

3. The stand gear for the keyboard as set forth in claim 1, further comprising:
   a paper stand board mounted on said stand base.

4. The stand gear for the keyboard as set forth in claim 1, further comprising:
   a board stand mounted on a paper stand board, wherein said paper stand board is pivotally mounted on said stand base.

5. The stand gear for the keyboard as set forth in claim 1, further comprising:
   a board stand mounted on a paper stand board, wherein said paper stand board is pivotally mounted on said stand arm.

6. The stand gear for the keyboard as set forth in claim 1, wherein said stopping means of said stand base is comprised of an elastically deformable material.

7. The stand gear for the keyboard as set forth in claim 6, wherein said stopping means of said stand base is wave-shaped.

8. The stand gear for the keyboard as set forth in claim 6, wherein said stopping means of said stand base is comprised of a plurality of grooves wherein any one of said grooves engages and stops the keyboard in its standing position.

9. The stand gear for the keyboard as set forth in claim 6, wherein said stopping means of said stand base is comprised of a sponge or other elastomeric material.

10. A stand gear for a keyboard, comprising:
    a holder attachable to the keyboard;
    a stand arm pivotally connected at one end thereof to said holder; and
    a stand base connected pivotally to another end of said stand arm and said stand base having a stopping means for engaging with and stopping the keyboard when the keyboard is placed in its standing position on said stand base.

11. The stand gear for the keyboard as set forth in claim 10, wherein a pivotal support shaft portion of said stand that engages said holder is movable therein, so as to make a tilt angle of the keyboard in its standing position adjustable.

12. A keyboard having a stand gear, wherein said stand gear comprises:
    a stand arm pivotally connected to said keyboard;
    a stand base pivotally connected to said stand arm; and
    a stopping means for engaging with and stopping said keyboard provided on said stand base, by which said keyboard is engaged and stopped when said keyboard is rotated into its standing position.

13. The keyboard having the stand gear as set forth in claim 12, wherein said keyboard includes a bearing means to which said stand gear is fitted.

14. The stand gear for the keyboard as set forth in claim 12, wherein said stopping means of said base is comprised of an elastically deformable material.

15. The stand gear for the keyboard as set forth in claim 14, wherein said stopping means of said stand base is wave-shaped.

16. The stand gear for the keyboard as set forth in claim 14, wherein said stopping means of said stand base is comprised of a plurality of grooves wherein any one of said grooves engages and stops the keyboard in its standing position.

17. The stand gear for the keyboard as set forth in claim 14, wherein said stopping means of said stand base is comprised of a sponge or other elastomeric material.

* * * * *